United States Patent
Lyons

(10) Patent No.: US 6,347,748 B1
(45) Date of Patent: Feb. 19, 2002

(54) PLUMBING ASSEMBLY FOR HYDRONIC HEATING SYSTEM AND METHOD OF INSTALLATION

(75) Inventor: Gerald T. Lyons, Indianapolis, IN (US)

(73) Assignee: Water Works Radiant Technologies, Inc., Indianapolis, IN (US)

( * ) Notice: Subject to any disclaimer, the term of this patent is extended or adjusted under 35 U.S.C. 154(b) by 0 days.

(21) Appl. No.: 09/770,991

(22) Filed: Jan. 26, 2001

(51) Int. Cl.⁷ ................................................. F24D 5/10
(52) U.S. Cl. ........................................ 237/69; 165/168
(58) Field of Search ............................. 237/69, 12.3 B, 237/66, 56; 165/168, 169

(56) References Cited

U.S. PATENT DOCUMENTS

| | | | |
|---|---|---|---|
| 2,784,945 A | * 3/1957 | Fodor | 237/69 |
| 2,823,695 A | 2/1958 | Coffin | |
| 3,536,097 A | 10/1970 | Caparone et al. | |
| 3,782,132 A | * 1/1974 | Lohoff | 62/260 |
| 3,873,022 A | * 3/1975 | Hilgemann | 237/8 R |
| 3,939,905 A | * 2/1976 | Gettmann | 165/49 |
| 4,321,943 A | 3/1982 | Haws | |
| 5,183,029 A | 2/1993 | Ranger | |
| 5,205,318 A | 4/1993 | Massaro et al. | |
| 5,390,660 A | * 2/1995 | Danielson | 126/271.2 R |
| 5,643,482 A | * 7/1997 | Sandelman et al. | 219/497 |
| 6,126,081 A | * 10/2000 | Calvin et al. | 237/12.3 B |

OTHER PUBLICATIONS

Siegenthaler, P.E., John, Modern Hydronic Heating, Delmar Publishers, Utica, New York 1995.

* cited by examiner

Primary Examiner—Harold Joyce
Assistant Examiner—Derek S. Boles
(74) Attorney, Agent, or Firm—Michael A. Myers; Bingham, Summers, Welsh & Spilman

(57) ABSTRACT

A plumbing assembly maintains temperature equilibrium of a hydronic heating system irrespective of the type of heat source used. The assembly facilitates all control methods characteristic of such heating systems through use of a heat loop, a pair of heat traps, a balancing valve and a controller. The plumbing assembly includes a zone supply conduit and a zone return conduit. The heat loop includes a first conduit with a supply end and a return end. A bypass valve is coupled between the supply end and the return end for controlling the flow of fluid through the heat loop. Two heat traps are provided, which comprise a first looped conduit connected to the first conduit upstream from the bypass valve, and a second looped conduit connected to the first conduit downstream from the bypass valve. An injection pump connected downstream from the first looped conduit draws fluid from the heat source injecting it into the system via the supply conduit. A balancing valve for controlling the flow of fluid returning to the assembly is connected upstream from the second looped conduit. At least one zone pump is included for circulating fluid from the assembly through the distributing system. The heat loop, heat traps, injection pump, bypass valve, balancing valve and controller are secured together as a single unit on a frame so that the plumbing assembly can be conveniently removably connected as a single unit between any heat source and distributing means. An expansion tank and air eliminator are also provided.

12 Claims, 4 Drawing Sheets

PLUMBING ASSEMBLY FOR HYDRONIC HEATING SYSTEM AND METHOD OF INSTALLATION

BACKGROUND

The present invention pertains to plumbing apparatus and more particularly pertains to a plumbing assembly for use in conjunction with a hydronic heating system.

Hydronic heating systems use water (or water-based solutions) to move thermal energy from where it is produced to where it is needed. The overall hydronic system consists of four interrelated parts: (1) a heat source; (2) a distribution system, or piping; (3) heat emitters (e.g., baseboard conductors, wall panel radiators, radiant floors); and (4) a control system, or controller. Upon demand for heat, water is circulated around the piping by the distribution system. The distribution system carries heat from the heat source to the heat emitter where it is released into the heated space.

In an ideal application, the rate at which the water absorbs heat from the heat source would exactly match the rate at which the heat is released by the heat emitters. This rate would also, ideally, match the rate of heat loss from the building. Unfortunately, in real applications, such ideal conditions seldom exist. A high performance boiler, for example, can deliver heat to a building much faster than the building loses heat on a mild day. Continuous operation of the boiler under these circumstances would quickly overheat the building. Different types of heat sources, such as boilers, (gas-, oil-fired, electric, condensing versus non-condensing) domestic hot water tanks, heat pumps and solar energy systems, present different control challenges for the system designer.

Irrespective of the type of heat source used, system control falls into one of the following categories: (i) on/off control; (ii) staged control, (iii) modulating control, or (iv) outdoor reset control.

On/off control devices operate by simply opening or closing electrical contacts and are by far the most common type used in hydronic heating systems. Control components such as room thermostats, burner relays and set point controls all function by either allowing or preventing an electrical signal to pass through a set of contacts. When on/off control devices are used to regulate the heat output of a system, they can only do so by turning the heat source on and off. They cannot vary the rate of heat output of the device they control. For example, turning a room thermostat to a high setting does not make the boiler burn fuel at a faster rate. It only keeps it on for a longer time while the room temperature increases toward the higher set point.

This presents a problem in heating systems having low thermal mass. On/off cycling tends to make the room stuffy or make people feel drowsy. When the furnace is shut off, drafts from windows and doors quickly re-establish themselves, which decreases comfort.

Staged control, however, increases the heat capacity of the heat source in fixed increments as the load increases. The number of increments, or stages, between zero and maximum heat output can vary from two to twelve or more. The higher number of stages is more common in larger commercial systems. The practicality of using a multi-stage heat source depends on the total heating load of the building and the type of heat source used. Two-stage operations can be considered for gas boilers or hydronic heat pumps. In such cases, a modular boiler (or modular heat pump) system using two identical units may be used. Electric boilers come with staged heating elements. Larger residential and light commercial buildings are very adaptable to multi-stage controls. In making the decision, the designer must weigh the extra cost associated with a multi-stage system against the potential fuel savings and more accurate system control.

Another type of control system, modulating controls, allow continuous variations in heat output over a range from zero to full output. Modulating controls are based on controlling the temperature of the water supplied to the heat emitters. As the supply temperature decreases, so does heat output. One method of doing this uses a motorized mixing valve to create a specific outlet temperature based on the proportions of supply and return water entering it. Another way is the use of a variable speed pump to inject hot water in a constantly circulating distribution circuit. Still another method, used with electric resistance boilers, is to control the electrical current through the element(s) using solid state power regulating devices. Additionally, some non-electric hydronic system components, e.g., the thermostatic radiator valve, also operate as modulating devices. Motorized mixing valves, variable speed pumps and regulating devices add significantly to overall cost and the number of man hours for system installation.

The fourth type, and perhaps the best method for matching the heat output of a hydronic system to the heating load of a building at any given time is the outdoor reset control. This control method makes small but frequent adjustments to the water temperature supplied to the distribution system. Sensors monitor the outdoor temperature and the temperature of the system. As the outdoor temperature decreases and building heating load increases, the supply water temperature is raised. When outdoor temperature increases, the supply water temperature is decreased. This is accomplished by increasing the rate at which heated water is injected into the distribution system. A variable speed controller and pump are typically used.

On/off control, staged control, modulating control and outdoor reset control describe the type of output signal(s) from the controller. Several control components are necessary to build an overall control system, and the components respond to the signals in different ways. For example, a pump may start, stop or run at a certain speed, while a mixing valve actuator may rotate very slightly. Control components add significantly to the overall cost of the system. They add installation procedures and man hours and must be carefully adjusted as determined by the type of heat source as well.

Additionally, combining control components is not simply a matter of choosing a favorite pump and valve and connecting them. Major subsystems such as the heat emitters and the heat source have certain temperature and flow rate changes that have to be observed if they are to function properly and meet their lifetime expectancy. Retrofit systems present special challenges if the subsystems are to remain intact. Failure to respect the operating characteristics of these subsystems and control components will result in installations that either underheat, overheat, waste energy, (e.g., cause corrosion of cast iron and steel in those types of boilers) or otherwise disappoint building occupants.

Thus, the goal of the designer of a hydronic heating system is to ensure that thermal equilibrium is established at conditions that properly heat spaces, but do not adversely affect the operation or longevity of the system's components.

Therefore, it is highly desirable to provide a new plumbing assembly for use in conjunction with a hydronic heating system.

It is also highly desirable to provide a new plumbing assembly that is removably connectable as a single unit to the distribution system and heat source.

It is also highly desirable to provide a new plumbing assembly that is capable of minimizing a hydronic heating system's use of expensive mixing valves, variable speed controllers or power regulating devices regardless of the control method under which such a heating system operates.

It is also highly desirable to provide a new plumbing assembly that is inexpensive to manufacture, easy to install and accommodates retrofit applications.

It is also highly desirable to provide a new plumbing assembly capable of controlling the heat output of a hydronic heating system so that it closely matches the current heating load of a building irrespective of the type of heat source used. Such plumbing assembly also must accommodate the on/off control, staged control, modulating control or the outdoor reset control method, respectively, or in combination.

It is also highly desirable to provide a new plumbing assembly capable of accommodating variable temperature and flow rate changes characteristic of major subsystems.

It is finally highly desirable to provide a new plumbing assembly that meets all of the above desired features.

SUMMARY

Therefore, it is an object of the invention to provide a new plumbing assembly for use in conjunction with a hydronic heating system.

It is also an object of the invention to provide a new plumbing assembly that is removably connectable as a single unit to the distribution system and heat source.

It is another object of the invention to provide a new plumbing assembly that is capable of minimizing a hydronic heating system's use of expensive mixing valves, variable speed controllers or power regulating devices regardless of the control method under which such a heating system operates.

It is yet another object of the invention to provide a new plumbing assembly that is inexpensive to manufacture, easy to install and accommodates retrofit applications.

It is another object of the invention to provide a new plumbing assembly capable of controlling the heat output of a hydronic heating system so that it closely matches the current heating load of a building irrespective of the type of heat source used. It is also an object of the invention to accommodate the on/off control, staged control, modulating control or the outdoor reset control method, respectively, or in combination.

It is still another object of the invention to provide a new plumbing assembly capable of accommodating variable temperature and flow rate changes characteristic of major subsystems.

It is finally an object of the invention to provide a new plumbing assembly that meets all of the above desired features.

In the broader aspects of the invention, there is provided a plumbing assembly for maintaining the temperature equilibrium of a hydronic heating system that has a heat source for heating fluid and a distributing means for distributing the heated fluid to at least one radiant zone and returning the fluid to the heat source. The plumbing assembly comprises a zone supply conduit with a supply port and a zone return conduit with a return port. A heat loop comprising a first conduit with a supply end and a return end is included. A bypass valve is connected to the first conduit between the supply end and the return end for controlling the flow of fluid from the supply end through the first conduit to the return end. A first looped conduit is connected to the first conduit upstream from the bypass valve, and a second looped conduit is connected to the first conduit downstream from the bypass valve.

DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION

Figure 1:
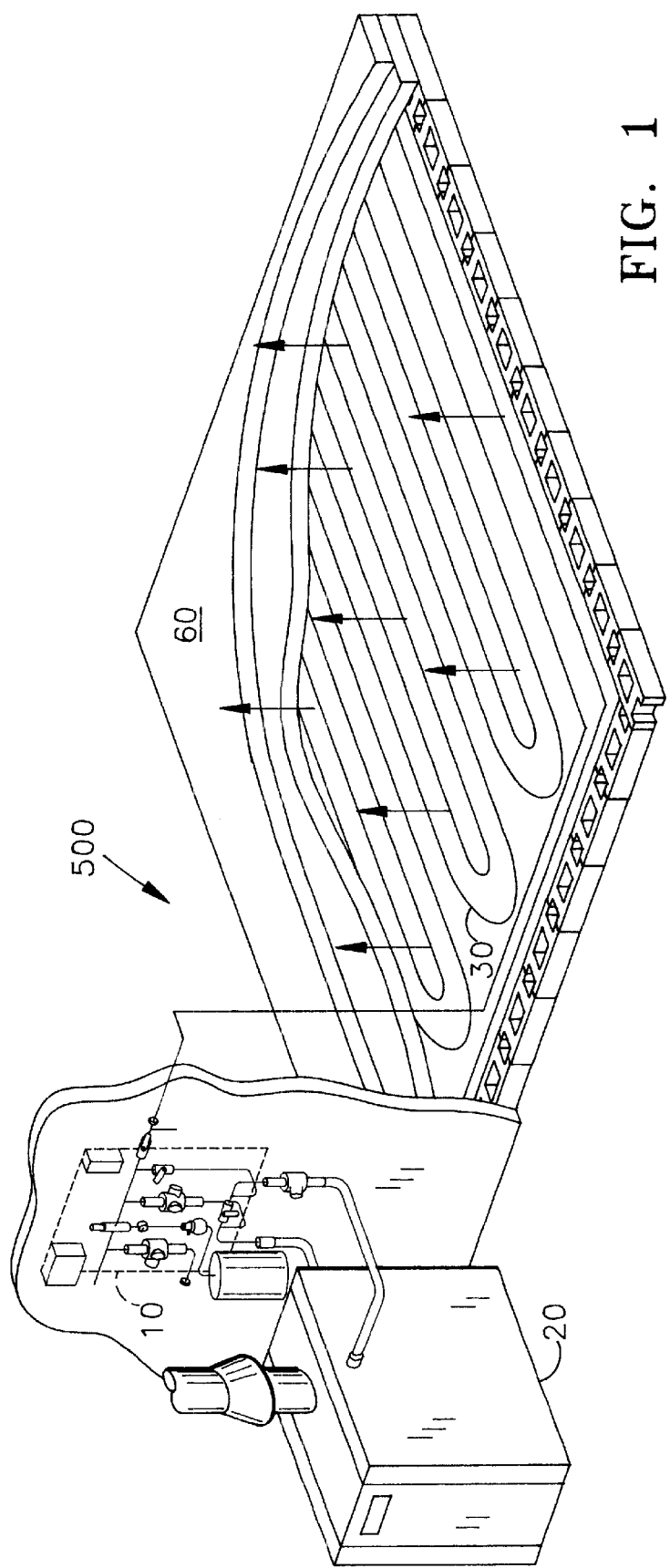
FIG. 1 is a cut-away perspective view of a hydronic heating system installed in a building showing the plumbing assembly connected to a heat source and distributing system.

Referring to FIG. 1, plumbing assembly 10 (within dotted line) is schematically shown in combination with a hydronic heating system 500. Heating system 500 is shown installed in the floor of a building. A description of the basic parts of a hydronic heating system, including its general principles of operation is provided first. A detailed description of the invention and its operation in conjunction with two different types of heat sources and control designs follows.

Hydronic heating system 500 includes heat source 20, distributing means 30 and heated spaces, or radiant zone(s) 60. Upon demand for heat, water is circulated around piping by distributing means 30. Distributing means 30 carries heat from heat source 20 to the heat emitter where it is released into radiant zone 60, as shown by the arrows in FIG. 1.

In the example shown in FIG. 1, the heat emitter is piping. Heat emitters are also selected from finned-tube baseboard convectors, fan-coil convectors, panel radiators, radiant baseboards and the like.

Energy costs, longevity and system control considerations typically determine the type of heat source 20 to be used. Gas- and oil-fired boilers are currently used in the vast majority of residential and commercial hydronic heating systems in the United States. This is largely due to lower energy costs associated with natural gas and fuel oil in the major hydronic market areas. Wood-fired boilers, electric resistance boilers and boilers that are a combination of these are also available. Electric water heaters, heat pumps and other devices, including renewable energy apparatus may also be used. Each type of heat source has its own advantages and shortcomings that must be considered.

Distributing means 30 usually consists of copper tubing, or piping, and fittings. Several polymer materials, however, are also practical and suitable for use as piping. Selection is based on considerations such as temperature and pressure ratings, availability, ease of installation, corrosion resistance, life expectancy, local code acceptance, and cost. Flexible polyethylene tubing may be ideal in retrofit situations where full access to framing cavities or other concealed building spaces may be impossible. Rigid copper tubing, however, has obvious advantages in areas where piping must be straight, or where components will be supported by the pipe. A combination of these materials may provide the ideal solution for a given installation. Care should be taken that copper tubing is supported using means known to skilled artisans. Copper tubing may be connected by several known soldering techniques as well.

Water is the most common substance used in hydronic systems because it is readily available in most locations, non-toxic, non-flammable, relatively inexpensive and has one of the highest heat storage abilities of any known material. The practical temperature for water in residential and light commercial hydronic systems is from about 50° F. to about 250° F.

Figure 2:
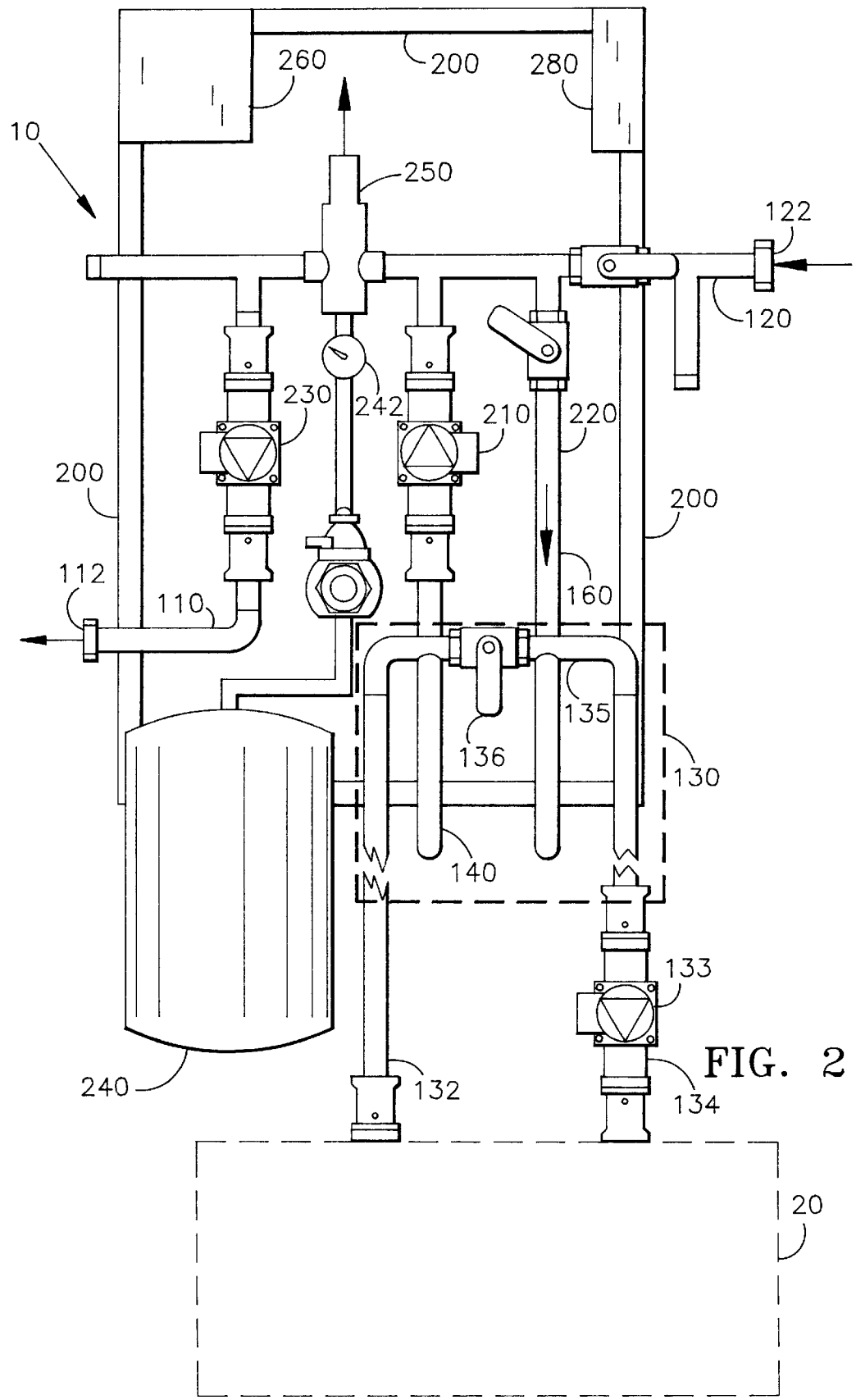
FIG. 2 is a schematic plan view of the plumbing assembly of the invention.

With reference to FIG. 2, plumbing assembly 10 has zone supply conduit 110 with supply port 112 and zone return conduit 120 with return port 122. Heat loop 130 (within dotted line) has first conduit 135 with supply end 132 and return end 134. Heat source 20, shown diagrammatically, is connected in fluid-tight fashion to first conduit 135 at supply end 132 and return end 134, as shown in FIG. 2. Heat source 20 may be selected from the group consisting of a boiler (gas-, oil-fired, electric, condensing versus non-condensing) domestic hot water tanks, heat pumps and renewable energy sources, such as geothermal and solar. In the event that heat source 20 has no pump, a pump 133 may be provided to add to the flow rate through first conduit 135. Bypass valve 136 is also connected to first conduit 135 between supply end 132 and return end 134. Bypass valve 136 is a shut-off valve for controlling fluid flow through fist conduit 135.

All conduits and piping disclosed herein, including zone supply and return conduits 110, 120 and first conduit 135 may be formed from copper tube or polymer materials, such as cross-linked polyethylene, and/or polybutylene tubing as desired. It should be understood that all plumbing connections are fluid-tight and employ known processes such that plumbing assembly 10 complies with local codes and federal regulations.

First looped conduit 140 is connected to first conduit 135 upstream from bypass valve 136. Second looped conduit 160 is connected to first conduit 135 downstream from bypass valve 136. Injection pump 210 is connected downstream from first looped conduit 140. Injection pump 210 is preferably an in-line type pump. This is the inventor's preferred pump because in-line type pumps have inlet and discharge ports axially aligned and thus, injunction pump 210 can be placed into a piping path without need for any lateral offset between the inlet and discharge ports. Additionally, injection pump 210 is connected downstream from first looped conduit 140 so that it is close to air separator 250. The fluid is least oxygenated at higher temperatures and thus, air eliminator 250 is most effective at this position. Injection pump 210 is preferably removably secured to assembly 10 using isolation flanges containing valves, which are known to skilled artisans. Thus, pump 210 may be isolated from the system and removed for servicing as required.

Zone supply and return conduits 110, 120, first conduit 135, bypass valve 136, first looped conduit 140, second looped conduit 160, injection pump 210 are secured together as a single unit on frame 200. This allows plumbing assembly 10 to be conveniently removably connected as a single unit between heat source 20 and distributing means 30, as described below. Frame 200 is formed from rigid material, such as steel or aluminum and is made from a sufficient gauge to support the weight of all the constituent parts of plumbing assembly 10. Frame 200 has bores (as known in the field) for receiving mounting bolts. As with all the pumps, injection pump 210 is connected using known means to plumbing assembly 10 and supported by the conduit. Care should be taken when mounting pump 210 to ensure that it is supported by frame 200 and not piping.

Balancing valve 220 is connected upstream from second looped conduit 160. Balancing valve 220 is a gate or ball valve adjustable between open and closed positions to a predetermined setting as desired.

At least one zone pump 230 is connected downstream from injection pump 210. Zone pump 230, like injection pump 210, is mounted such that it can be removed for servicing if necessary. Bolted flanges are used as above-described and may include any one of known valving means for isolating pump 230. For systems having a plurality of radiant zones 60, a manifold(s) (not shown) for "splitting" fluid flow to different zones may be included.

Controller 260 is provided for controlling operation of the system. Controller 260 comprises electrical contacts, switches, relays, transformers and the like that provide signals to the subsystems. System planning is key to the appropriate selection of control elements.

Generally, each zone 60 has its own pump responsive to the particular type of output signal from the control. Pumps come in a wide variety of designs, sizes and performance ranges and may be capable of operating at variable speeds. System designers should select the type best suited for the particular system, heat source and control strategy. The inventor's preferred mode is the provision of a wet rotor type pump 230. These pumps require less maintenance, use water to lubricate their mechanical parts and operate quietly.

An expansion tank 240 is connected downstream from inlet port of injection pump 210 and upstream from zone pump 230. For residential and light commercial applications, expansion tank 240 may be a diaphragm-type expansion tank with a volume of between about two and thirteen gallons. Care should be taken that the diaphragm material used in the tank is chemically compatible with the fluid used in the hydronic system. Expansion tank 240 should also be selected so that during operation it may reach a pressure of about 5.0 pounds per square inch (psi) lower than the heat source relief valve setting during maximum operating temperature. Expansion tank 240 is mounted to frame 200 with a standard 0.50 inch male pipe thread connection from which such tanks are usually designed to hang. It is also preferable to install pressure gauge 242 near the inlet of expansion tank 240.

Air eliminator 250 is connected downstream from injection pump 210 and heat source 20. Air eliminator 250 has a high point vent for releasing air from the system. The inventor prefers air eliminator 250 with a float device, which automatically bleeds piping for deareation of the system.

In operation, thermal energy is absorbed by the water at heat source 20, conveyed by the water through distributing means 30, and finally released into heated space 60, as shown in FIG. 1. For purposes of illustration, two methods of system control, the outdoor reset design and the on/off control method, are described below. In this first example, a fuel-fired boiler serves to illustrate the improvements provided by plumbing assembly 10.

The outdoor reset control method makes small but frequent adjustments to the water temperature supplied to the distribution system. Sensors monitor the outdoor temperature and the temperature of the system. As the outdoor temperature decreases and building heating load increases, the supply water temperature is raised. When outdoor temperature increases, the supply water temperature is decreased. This is accomplished by increasing the rate at which heated water is injected into the distribution system. A variable speed controller and pump are typically used.

Figure 5:
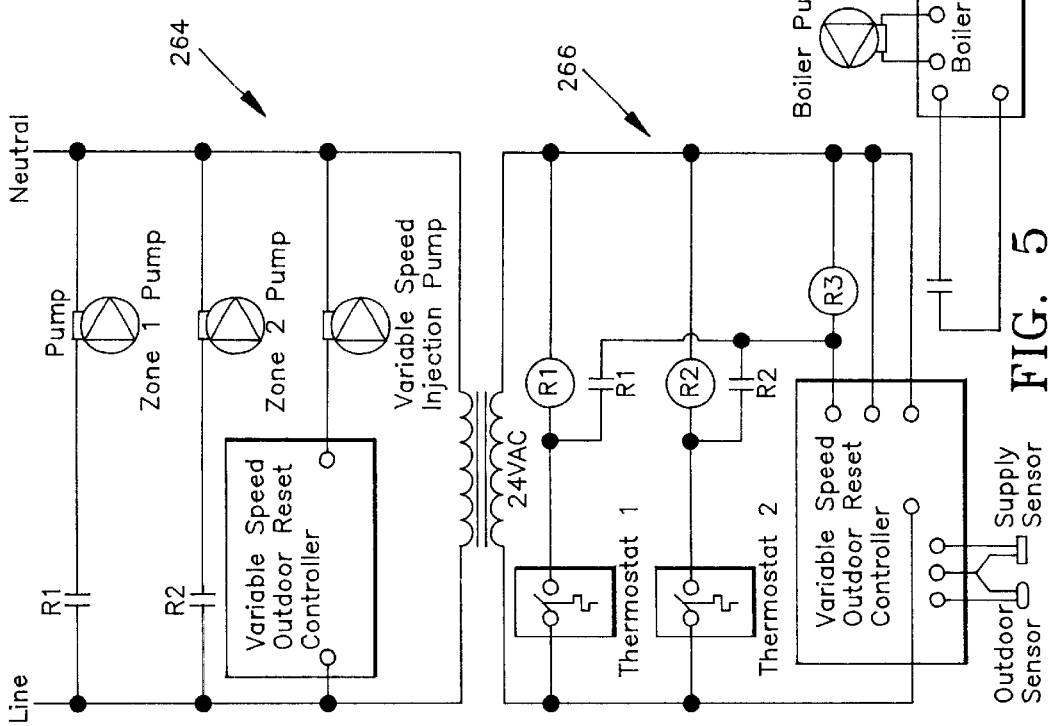
FIG. 5 is a ladder diagram for a two-zone variable speed outdoor reset control design using a fuel-fired boiler as a heat source.

FIG. 5 is a diagrammatic illustration of the controller for a two-zone hydronic heating system that employs a variable speed outdoor reset control system. Heat source 20 is a fuel-fired boiler, which is sensitive to water temperature and flow rates. Since the boiler heats water in small volumes, it is critical that the system not demand larger volumes than the boiler can provide per unit of time. The system would fail and the boiler would be ruined. Thus, the temperature of the water and flow rate have to be monitored and controlled.

Figure 3:
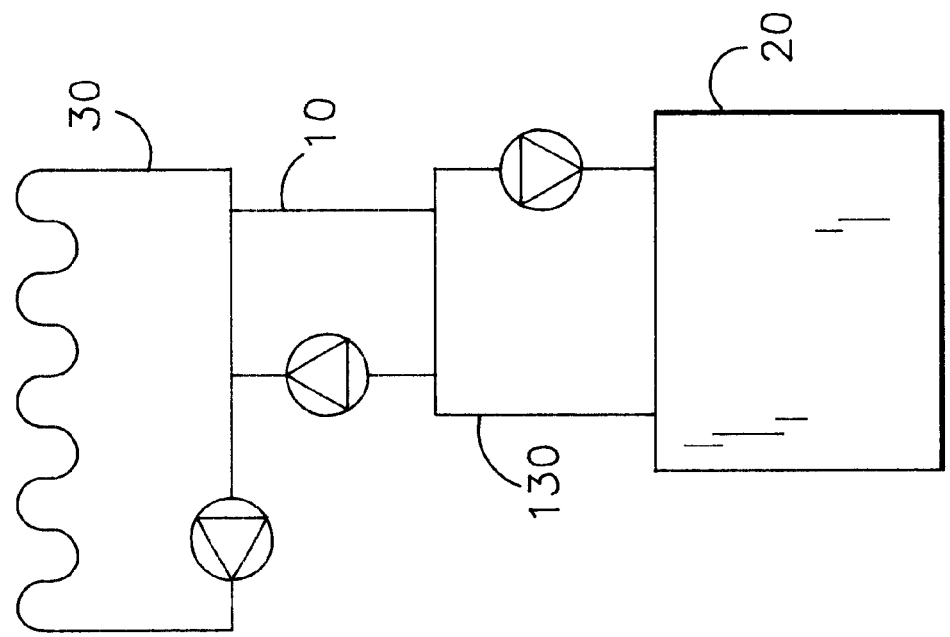
FIG. 3 is a simplified diagrammatic view of the plumbing assembly connected to a heat source and distributing system showing the flow direction of the fluid when the by pass valve is in the open position.

This is accomplished by permitting heated water to flow through heat loop 130 independently of distribution system 30, as shown by FIG. 3. With reference to the ladder diagram of FIG. 5, for this example, the control design comprises three control loops: the high temperature boiler control loop 262, the injection control loop 264 and the heating system control loop 266. There are two control components used, a switching relay and a variable speed mixing controller. The switching relay has terminals, relays and a transformer, as shown in FIG. 5. A single phase 115V power source (not shown) is the preferred power source for the control relay. Thermostats are also provided for sensing the temperature in the radiant zones and triggering the switching relays, which turn on and off the zone pumps accordingly. The variable speed controller varies the speed of the injection pump 210 electronically in response to the supply water and outdoor sensors.

Plumbing assembly 10 prevents corrosion of the boiler and in combination with the controller causes the system to operate efficiently. With reference to FIG. 3, according to this example, bypass valve 136 is placed in the open position permitting water to flow within heat loop 130 independently of distribution system 30. Balancing valve 220 is adjusted so that at maximum speed injection pump 210 injects heated water into distributing means 30 via zone supply conduit 110 at a small volume per unit of time, which is a rate commensurate with the boiler's output. First and second conduits 140, 160 prevent gravitational migration of heated fluid into the system.

Thus, plumbing assembly 10 establishes thermal equilibrium at conditions that properly heat the radiant zones without adversely affecting the operation or longevity of the fuel-fired boiler. Though the use of a variable speed controller is described under this example, no mixing valves are needed, which reduces system cost and man hours required for installation. Additionally, the variable speed controller and pump may be replaced by a standard pump and the balancing valve adjusted to yield system equilibrium.

Figure 6:
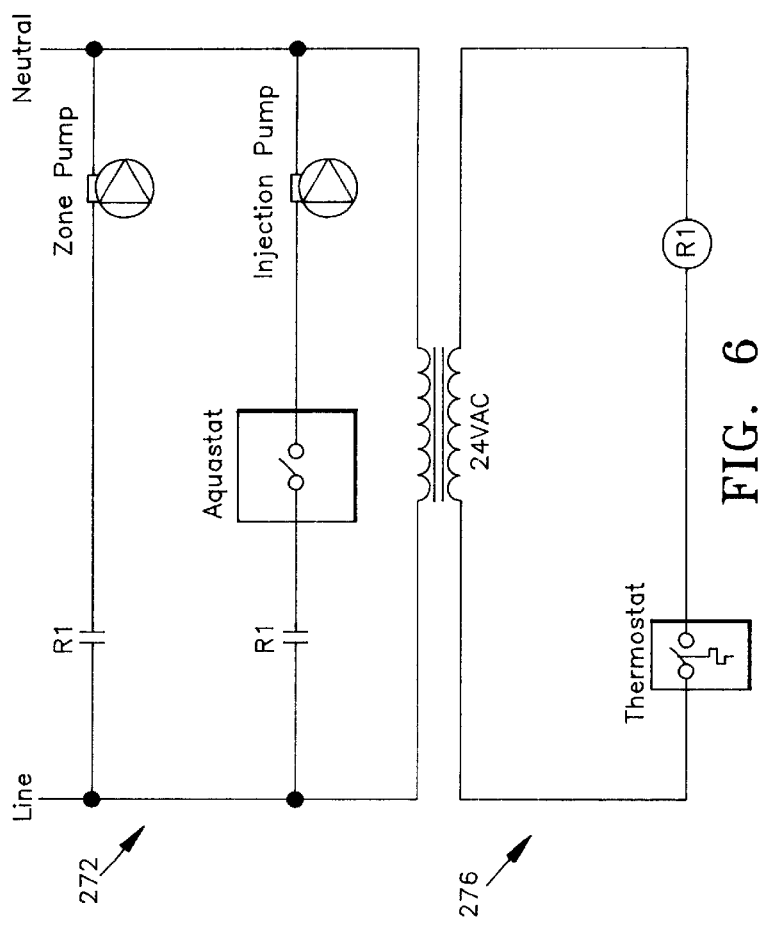
FIG. 6 is a ladder diagram for a single-zone fixed set point control design using a domestic water heater as a heat source.

FIG. 6 is a diagrammatic illustration of the controller for a single-zone hydronic heating system that uses an on/off control system. Heat source 20 is a domestic water heater. Unlike the boiler, a hot water heater heats and maintains large volumes of water at a predetermined temperature. It is nonetheless just as critical as in the example using the boiler, however, that the temperature of the water and flow rate be monitored and controlled so as to maintain thermal equilibrium of the system and to prevent over cycling of the water heater.

On/off control devices operate by simply opening or closing electrical contacts and are by far the most common type used in hydronic heating systems. Control components such as room thermostats, burner relays and set point controls all function by either allowing, or preventing an electrical signal to pass through a set of contacts. When on/off control devices are used to regulate the heat output of a system, they can only do so by turning the heat source on and off. They cannot vary the rate of heat output of the device they control. For example, turning a room thermostat to a high setting does not make the boiler burn fuel at a faster rate. It only keeps it on for a longer time while the room temperature increases toward the higher set point.

For this example, as shown in FIG. 6, the control design comprises just two control loops: the heated water control loop 272 and the heating system control loop 276. The main control components include a switching relay and an aquastat. The switching relay has terminals, relays and a transformer; and, a single phase 115V power source (not shown) is the preferred power source for the control relay. The aquastat may be an electromechanical bulb or a thermistor type (resistive thermometer) as desired. The aquastat is secured at the return side.

Figure 4:
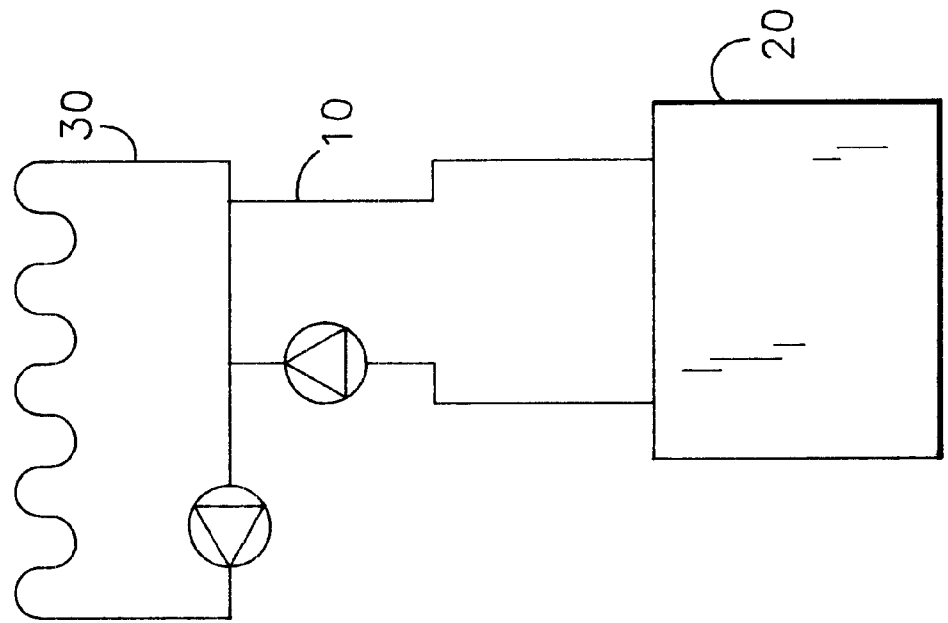
FIG. 4 is a simplified diagrammatic view like FIG. 3 showing the flow direction of the fluid when the by pass valve is in the closed position.

Plumbing assembly 10 establishes thermal equilibrium at conditions that properly heat the radiant zone without adversely affecting the operation or longevity of injection pump 210 and water heater 20. According to this example, bypass valve 136 is placed in the closed position preventing water from flowing through heat loop 130, as shown in FIG. 4. First and second conduits 140, 160 prevent gravitational migration of heated fluid into the system. Balancing valve 220 is adjusted so that injection pump 210 injects heated water into distributing means 30 via zone supply conduit 110 at a rate commensurate with the water heater's output. Electrical contacts on the aquastat open and close in response to the return temperature of the water. Depending on the desired temperature, a five degree Fahrenheit (5° F.) differential, for example, will cause the contacts on the aquastat to close at 97.5° F. and to open at 102.5° F. where the set point is 100° F. Thus, plumbing assembly 10 prevents short cycling of injection pump 210 and water heater 20 and causes the system to operate efficiently. Plumbing assembly 10 averts the use of variable speed pumps and mixing valves as well.

It should be understood from the examples that many different control designs may be implemented in combination with plumbing assembly 10 depending on the type of heat source used. Plumbing assembly 10 is removably connectable as a single unit to distribution system 30 and heat source 20. The unique combination of heat loop 130, bypass valve 136, balancing valve 220 and its other components enable plumbing assembly 10 to control the heat output of a hydronic heating system so that it closely matches the heating load of a building irrespective of the type of heat source used. Additionally, plumbing assembly 10 accommodates the on/off control, staged control, modulating control or the outdoor reset control methods individually, or in combination. Finally, since plumbing assembly 10 is made from piping, valves and pumps, it is inexpensive to manufacture, easy to install and accommodates retrofit applications.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A plumbing assembly for maintaining the temperature equilibrium of a hydronic heating system that has a heat source for heating fluid, and distributing means for distributing said fluid to at least one radiant zone and returning said fluid to said heat source, said plumbing assembly comprising:

(i) a zone supply conduit with a supply port;

(ii) a zone return conduit with a return port;

(iii) a heat loop comprising a first conduit with a supply end and a return end, and a bypass valve coupled between said supply end and said return end for controlling the flow of fluid from said supply end through said first conduit to said return end;

(iv) a first looped conduit connected to said first conduit upstream from said bypass valve; and, (v) a second looped conduit connected to said first conduit downstream from said bypass valve.

2. The plumbing assembly of claim 1 wherein said zone supply and return conduits, said heat loop, said bypass valve, said first looped conduit and said second looped conduit are secured together as a single unit on a frame, wherein said plumbing assembly is removably connectable as a single unit between said heat source and said distributing means.

3. The plumbing assembly of claim 1 wherein an injection pump is connected downstream from said first looped conduit.

4. The plumbing assembly of claim 1 wherein a balancing valve is connected upstream from said second looped conduit.

5. The plumbing assembly of claim 3 wherein a balancing valve is connected upstream from said second looped conduit.

6. The plumbing assembly of claim 5 wherein said zone supply and return conduits, said first conduit, said bypass valve, said first looped conduit, said second looped conduit, said injection pump and said balancing valve are secured together as a single unit on a frame, wherein said plumbing assembly is removably connectable as a single unit between said heat source and said distributing means.

7. A plumbing assembly for maintaining the temperature equilibrium of a hydronic heating system that has a heat source for heating fluid, and distributing means for distributing said fluid to at least one radiant zone and returning said fluid to said heat source, said plumbing assembly comprising:

(i) a zone supply conduit with a supply port;

(ii) a zone return conduit with a return port;

(iii) a heat loop comprising a first conduit with a supply end and a return end, and a bypass valve coupled between said supply end and said return end for controlling the flow of fluid from said supply end through said first conduit to said return end;

(iv) a first looped conduit connected to said first conduit upstream from said bypass valve;

(v) a second looped conduit connected to said first conduit downstream from said bypass valve;

(vi) an injection pump connected downstream from said first looped conduit;

(vii) a balancing valve connected upstream from said second looped conduit, wherein said zone supply and return conduits, said heat loop, said bypass valve, said first looped conduit, said second looped conduit, said injection pump and said balancing valve are secured together as a single unit on a frame; and, (viii) at least one zone pump connected downstream from said injection pump, said zone pump being secured to said frame.

8. The plumbing assembly of claim 7 further comprising an expansion tank and an air eliminator, said expansion tank and said air eliminator being connected downstream from said injection pump and upstream from said at least one zone pump.

9. The plumbing assembly of claim 8 including a controller secured to said frame for controlling operation of such a hydronic heating system.

10. The plumbing assembly of claim 9 in combination with such a distributing means, and such a heat source selected from the group consisting of a boiler, a domestic hot water heater, a heat pump, a renewable energy heat source.

11. A method of installing a hydronic heating system that has a heat source for heating fluid, and a distributing means for distributing said fluid to at least one radiant zone and returning said fluid to said heat source, the method comprising the steps of:

(a) securing together as a single unit on a frame:

(i) a zone supply conduit with a supply port;

(ii) a zone return conduit with a return port;

(iii) a heat loop comprising a first conduit having a supply end and a return end, and connecting a bypass valve to said first conduit between said supply end and said return end;

(iv) a first looped conduit, said first looped conduit being connected to said first conduit upstream from said bypass valve;

(v) a second looped conduit, said second looped conduit being connected to said first conduit downstream from said bypass valve;

(vi) an injection pump, said injection pump being connected downstream from said first looped conduit;

(vii) a balancing valve, said balancing valve being connected upstream from said second looped conduit;

(viii) at least one zone pump, said at least one zone pump being connected downstream from said injection pump;

(ix) a controller for operation of such a hydronic heating system;

(b) connecting the heat source and said plumbing assembly in a fluid-tight fashion; and, (c) connecting the distributing means and said plumbing assembly in a fluid-tight fashion, wherein thermal energy is absorbed by the fluid at the heat source and repeatedly cycled to a radiant zone and back to said heat source via said plumbing assembly and the distributing means.

12. The method of claim 11 wherein said heat source is selected from the group consisting of a boiler, a domestic hot water heater, a heat pump, a renewable energy heat source.

* * * * *